Patented May 23, 1944

2,349,276

UNITED STATES PATENT OFFICE 2,349,276

PREPARATION OF TOCOPHEROL PRODUCTS

Kenneth C. D. Hickman, Rochester, N. Y., assignor to Distillation Products, Inc., Rochester, N. Y., a corporation of Delaware No Drawing. Application December 6, 1941, Serial No. 422,014

4 Claims. (Cl. 260—333)

This invention relates to improved procedure for preparing tocopherol preparations and in particular procedure for the preparation of tocopherol in relatively concentrated form.

Tocopherol has been known to exist for a number of years and is known to have therapeutic properties. However, the material has been exceedingly expensive until the advent of my invention. Until recently the only source of tocopherol was vegetable oils such as wheat germ oils. These oils contain the tocopherol in minute amounts being substantially less than $\frac{1}{10}$ per cent in concentration. Concentrates of such oils have been prepared by saponification of the oils, but the saponification procedure as heretofore carried out resulted in considerable destruction of the tocopherol thus adding substantially to the final cost of the concentrate. Recently tocopherol has been synthesized but the starting materials are expensive and the yields are poor.

This invention has for its object to provide a cheap source of tocopherol. A further object is to provide improved procedure for the preparation of tocopherol. Other objects will appear hereinafter.

These and other objects are accomplished by my invention, which includes treating scum removed from the carrier gas utilized for the carrier gas-vacuum treatment of a vegetable or animal oil which contains tocopherol with an adsorbent.

In the following description and claims I have set forth several of the preferred embodiments of my invention, but it is to be understood that these are given for the purpose of illustration and not in limitation thereof.

The scum which is utilized in my invention is a substance which has heretofore been a waste by-product of the vegetable and animal oil (i. e. glyceride oil) industry and particularly the deodorization industry. This material is a complex mixture of organic compounds volatilized from the oil during deodorization and like procedures. The most common method of deodorizing vegetable and animal oils is to pass steam therethrough under reduced pressure. The steam after passing through the oil is usually condensed in a barometric condenser and the condensed steam is then permitted to flow into a sump, catch basin, or condenser discharge. The scum separates on the surface of the water in the sump or condenser and may be skimmed off. It has heretofore been the usual practice to permit it to flow into the sewer. The scum also collects on the walls of the apparatus and may be removed therefrom. Such materials are known in the deodorization art as "deodorizer hotwell sludge," "catch basin scum," "catch-all sludge," etc. It is also somewhat common procedure in the deodorizing field to place a trap between the deodorizer and the condenser, in which case the scum or its substantial equivalent is partially or completely condensed in the trap instead of entirely passing into the barometric catch basin or sump. Such material is known in the deodorizing art as "trap sludge." It is to be understood that the word scum as used herein and in the claims shall include all such matters in crude or partially refined condition produced by the methods mentioned or by any equivalent method involving the separation of the organic material volatilized during the carrier gas, vacuum treatment of vegetable and animal oils which contain tocopherol.

Useful scum can only be obtained from the foregoing procedures when applied to oils which contain tocopherol. Most of the vegetable and animal oils in their fresh and natural condition contain this material, but the vegetable oils are usually considerably richer sources and I prefer to utilize scum produced from them. Examples of particularly rich oils are corn, cottonseed, and soybean. Fresh oils are preferred as a source of the scum and particularly oils which have been subjected to no treatment which would have a harmful effect upon the tocopherol. Ordinarily alkali refining is undesirable since it decreases the tocopherol content, but oils which have been alkali refined can serve as a source, although a poor one.

The scum as ordinarily obtained from the deodorizer contains about 5 to 20 per cent water which is emulsified with the organic constituents present. I prefer first to remove the water content of the scum which may be accomplished by any desired dehydrating procedure such as distillation, dehydrating agents, and the like. I prefer to remove the water by heating the mixture to the melting point so that the scum separates as an upper oil layer. This layer can then be decanted or withdrawn and treated with solvents as described. It may also be advantageous to pretreat the scum in order to effect a preliminary concentration.

It is possible to contact the scum with the adsorbent without first dissolving in a solvent, however since the scum is usually viscous at relatively low temperatures and therefore does not always readily pass through finely ground solids, I prefer to use a solvent. While the scum is a complicated mixture of organic substances, it is soluble in most fat solvents and such solvents can in general be used according to my invention. Solvents such as ligroin (B. P. 70–90° C.), petroleum ether and petroleum fractions are preferred. The solution of scum in a solvent is then contacted with the adsorbent. It is preferred that the adsorbent be in the form of a column or other body and that the scum be passed therethrough. The tocopherol can then be recovered from the solution after it has passed through an adsorbent. In most cases I prefer to utilize an alkaline adsorbent since such adsorbents increase the concentration and remove a greater amount of impurities.

The solvent used to dissolve the scum is preferably one which is non-eluting or one which has relatively weak eluting properties. Most non-polar solvents belong to this class. The adsorbent can then be washed with successive amounts of a more powerful eluting solvent such as benzene, toluene or xylene to remove the tocopherol. It appears that the tocopherol is less tenaciously held by the adsorbent than many of the impurities. This is particularly true of alkaline adsorbents. The tocopherol can, therefore, be eluted from the adsorbent with an eluting solvent and without simultaneous removal of the adsorbed impurities.

Examples of satisfactory adsorbents are "Doucil," "Decalso," and "Zeo-Karb"; alkali hydroxides such as calcium hydroxide, and carbonates such as zinc carbonate, calcium phosphate, aluminum oxide and magnesium oxide.

Example

A sample of dried scum (1.0 g.; acid value 96; per cent tocopherol 3.35) was dissolved in 10 cc. of petroleum ether (B. P. 35–65°) and filtered through 17 g. of "Doucil" (a sodium, aluminum silicate used for water softening) in an adsorption column 6½" long by ¾" diameter. The column was washed by 70 cc. of petroleum ether, then with 70 cc. of benzene. The solvent fractions were evaporated separately to give two fractions described in the table.

| Solvent | Weight of fraction | Cut | Tocopherol | Initial tocopherol | Acid value |
|---|---|---|---|---|---|
| | | Per cent | Per cent | Percent | |
| Petroleum ether | .368 | 36.8 | 4.56 | 48.5 | .75 |
| Benzene | .131 | 13.1 | 11.8 | 45.5 | 2.00 |

It is evident that about 50% of the initial tocopherol was obtained in a concentrate containing 11.8% tocopherol. Thus, a 3.5 fold concentration of tocopherol was accomplished. The remaining 50% of the initial tocopherol was acid free (acid value 0.75) but was mixed with glycerides which were not removed during adsorption. Its concentration (4.56%) was about that of the starting material.

Reference is made to my copending application 321,913, filed March 2, 1940, which relates to the separation of tocopherol from deodorizer scum.

What I claim is:

1. The process for preparing a tocopherol concentrate from lighter-than-water scum removed from the carrier gas utilized for the carrier gas-vacuum deodorization treatment of a vegetable or animal glyceride which contains tocopherol, which comprises treating the scum with an alkaline adsorbent.

2. The process for preparing a tocopherol concentrate from lighter-than-water scum removed from the steam utilized for the steam-vacuum deodorization treatment of a vegetable or animal glyceride which contains tocopherol, which process comprises dissolving the scum in a solvent and then treating the scum-solvent mixture with an adsorbent.

3. The process for preparing a tocopherol concentrate from lighter-than-water scum removed from the steam utilized for the steam-vacuum deodorization treatment of a vegetable or animal glyceride which contains tocopherol, which process comprises dissolving the scum in a substantially non-eluting solvent passing this solution through a body of an alkaline adsorbent and then removing the adsorbed tocopherol by passing an eluting solvent through the body of alkaline adsorbent.

4. The process for preparing a tocopherol concentrate from lighter-than-water scum removed from the steam utilized for the steam-vacuum deodorization treatment of a vegetable or animal oil which contains tocopherol, which process comrises dissolving the scum in petroleum ether passing the petroleum ether solution through an alkaline adsorbent eluting the adsorbent with petroleum ether and then with benzene and recovering the tocopherol from the benzene filtrate.

KENNETH C. D. HICKMAN.